(12) United States Patent
Lehikoinen et al.

(10) Patent No.: US 7,069,003 B2
(45) Date of Patent: Jun. 27, 2006

(54) METHOD AND APPARATUS FOR AUTOMATICALLY UPDATING A MOBILE WEB LOG (BLOG) TO REFLECT MOBILE TERMINAL ACTIVITY

(75) Inventors: Jaakko Lehikoinen, Hämeenkyrö (FI); Jussi Impiö, Pälkäne (FI); Hannu Korhonen, Tampere (FI); Mika Röykkee, Pirkkala (FI); Pekka Ollikainen, Tampere (FI)

(73) Assignee: Nokia Corporation, Espoo (FI)

( * ) Notice: Subject to any disclaimer, the term of this patent is extended or adjusted under 35 U.S.C. 154(b) by 126 days.

(21) Appl. No.: 10/679,576

(22) Filed: Oct. 6, 2003

(65) Prior Publication Data

US 2005/0075097 A1 Apr. 7, 2005

(51) Int. Cl.
*H04M 3/42* (2006.01)
*H04Q 7/22* (2006.01)
*H04B 1/38* (2006.01)

(52) U.S. Cl. .............................. 455/414.2; 455/456.1; 455/566; 455/457

(58) Field of Classification Search ............. 455/414.1, 455/414.2, 412.1, 456.1, 456.3, 457, 461, 455/462, 463, 556.1, 557, 566, 90.1, 556.2; 709/902, 206
See application file for complete search history.

(56) References Cited

U.S. PATENT DOCUMENTS

| | | | | |
|---|---|---|---|---|
| 6,529,218 B1* | 3/2003 | Ogawa et al. | ............... | 715/799 |
| 2002/0164995 A1* | 11/2002 | Brown et al. | ............... | 455/456 |
| 2003/0035412 A1* | 2/2003 | Wang et al. | ............... | 370/352 |
| 2003/0233422 A1* | 12/2003 | Csaszar et al. | ............. | 709/206 |
| 2004/0015562 A1* | 1/2004 | Harper et al. | ............... | 709/217 |
| 2004/0235520 A1* | 11/2004 | Cadiz et al. | ................ | 455/557 |
| 2005/0064852 A1* | 3/2005 | Baldursson | .............. | 455/414.2 |
| 2005/0073443 A1* | 4/2005 | Sheha et al. | ............. | 340/995.1 |

* cited by examiner

*Primary Examiner*—Duc M. Nguyen
(74) *Attorney, Agent, or Firm*—Harrington & Smith, LLP

(57) ABSTRACT

A mobile terminal includes a memory storing application software and data that is descriptive of the use of the mobile terminal, a display and a controller that is coupled to the memory. The controller is responsive to the application software and to at least a sub-set of the stored data for visualizing on the display, in a graphical form, the use of the mobile station over a period of time. The controller preferably constructs a temporally-based visualization of the use of the mobile station, such as a timeline visualization of the use of the mobile station. The controller may further be responsive to the application software and to at least the sub-set of the stored data for automatically deriving a content of a user's web log (blog). A method is also disclosed to operate a mobile terminal having a memory storing application software and data that is descriptive of the use of the mobile terminal, and that further has a display and a controller coupled to the memory. The method includes selecting at least a portion of the data and constructing a blog that is indicative of the use of the mobile station over a period of time, as indicated by the selected portion of the data. The blog may include an animation that is indicative of the use of the mobile station over the period of time, and may also include textual data that is automatically generated in accordance with the use of the mobile station over the period of time.

34 Claims, 3 Drawing Sheets

US 7,069,003 B2

METHOD AND APPARATUS FOR AUTOMATICALLY UPDATING A MOBILE WEB LOG (BLOG) TO REFLECT MOBILE TERMINAL ACTIVITY

TECHNICAL FIELD

This invention relates generally to mobile communication devices and terminals and, more specifically, relates to user interfaces for mobile terminals, in particular, to those mobile terminals capable of publishing a web log, also known as a blog.

BACKGROUND

A blog can be defined as a frequent, chronological publication of personal thoughts and Web links. A blog is often a mixture of what is occurring in a person's life and what is occurring on the Web. It is a living journal, an online chronicle of personal, creative and organizational life. It functions as a type of hybrid diary/guide site and there can be as many unique types of blogs as there are individual blog users, i.e., bloggers. While blogs are also sometimes referred to as web logs or weblogs, the term "blog" is less likely to create confusion, as the term "web log" can also refer to a server's log files.

Although web users maintained blogs before the term was coined, the trend gained momentum with the introduction of automated publishing systems, such as Blogger at blogger.com. Web users employ services such as Blogger to simplify and accelerate the publishing process.

Bloggers often have a strong desire to express themselves in many different ways on the web. Mobile communication devices provide a new method to publish and update blogs easily. One of the features that contributes to the popularity of blogs is that they are easily updatable, i.e., new information can be published frequently, which makes blogs "alive".

Modern mobile terminals, such as cellular telephones, generate, collect and maintain a considerable amount of user data. This user data can include call logs (e.g., when and to where a call was made, how long the call lasted, the occurrence of incoming and missed calls, etc.), as well as records of text messages that are sent and received, and calendar-related information. However, this data is currently not widely used by most mobile terminal users.

SUMMARY OF THE PREFERRED EMBODIMENTS

The foregoing and other problems are overcome, and other advantages are realized, in accordance with the presently preferred embodiments of these teachings.

This invention provides a method to update a mobile blog automatically to include a user's information that is stored in a memory of a mobile terminal, and further provides a mobile terminal that operates in accordance with the method. The use of this invention enhances the living nature and timeliness of blogs. The invention enables a blog user to employ a mobile communications device or mobile terminal to publish a wide variety of information including, but not limited to, phone call logs, calendar applications, images taken with an integral camera or otherwise, and personal information.

The mobile terminal collects and stores activity data, such as calls, messages, SMS, images and sound data, and content data, such as sensor data and location data. As the usage of the mobile terminal is in many cases ubiquitous and highly correlated with the user's daily activity, it can be appreciated that the user information that is stored in a memory of a mobile terminal can be very descriptive of the user's typical work or leisure day, and is thus well suited for forming the basis of the user's mobile blog entries.

This invention describes a technique for presenting this mobile terminal usage-related data to the user in a visual representation, and for then utilizing user-selected data to automatically update the user's blog. The presentation of the usage-related data can be, for example, temporally based, i.e. as a timeline representation, for the convenience of the user, but is not limited to this representation. The use of this invention enhances the user's mobile blog experience by facilitating the publishing of user-created content, including text and images. This invention, in one aspect, uses a visual representation of the data, such as an animation or other feedback method such as text, sound or haptic feedback to represent or characterize the user's blog data.

In one aspect this invention provides a mobile terminal that includes a memory storing application software and data that is descriptive of the use of the mobile terminal, a display and a controller that is coupled to the memory. The controller is responsive to the application software and to at least a sub-set of the stored data for visualizing on the display, in a graphical form, the use of the mobile station over a period of time. The controller preferably constructs a temporally-based visualization of the use of the mobile station, such as a timeline visualization of the use of the mobile station. The controller may further be responsive to the application software and to at least the sub-set of the stored data for automatically deriving a content of a user's web log (blog).

In another aspect this invention provides a method to operate a mobile terminal having a memory storing application software and data that is descriptive of the use of the mobile terminal, and that further has a display and a controller coupled to the memory. The method includes selecting at least a portion of the data and constructing a blog that is indicative of the use of the mobile station over a period of time, as indicated by the selected portion of the data. The blog may include an animation that is indicative of the use of the mobile station over the period of time, and may also include textual data that is automatically generated in accordance with the use of the mobile station over the period of time.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
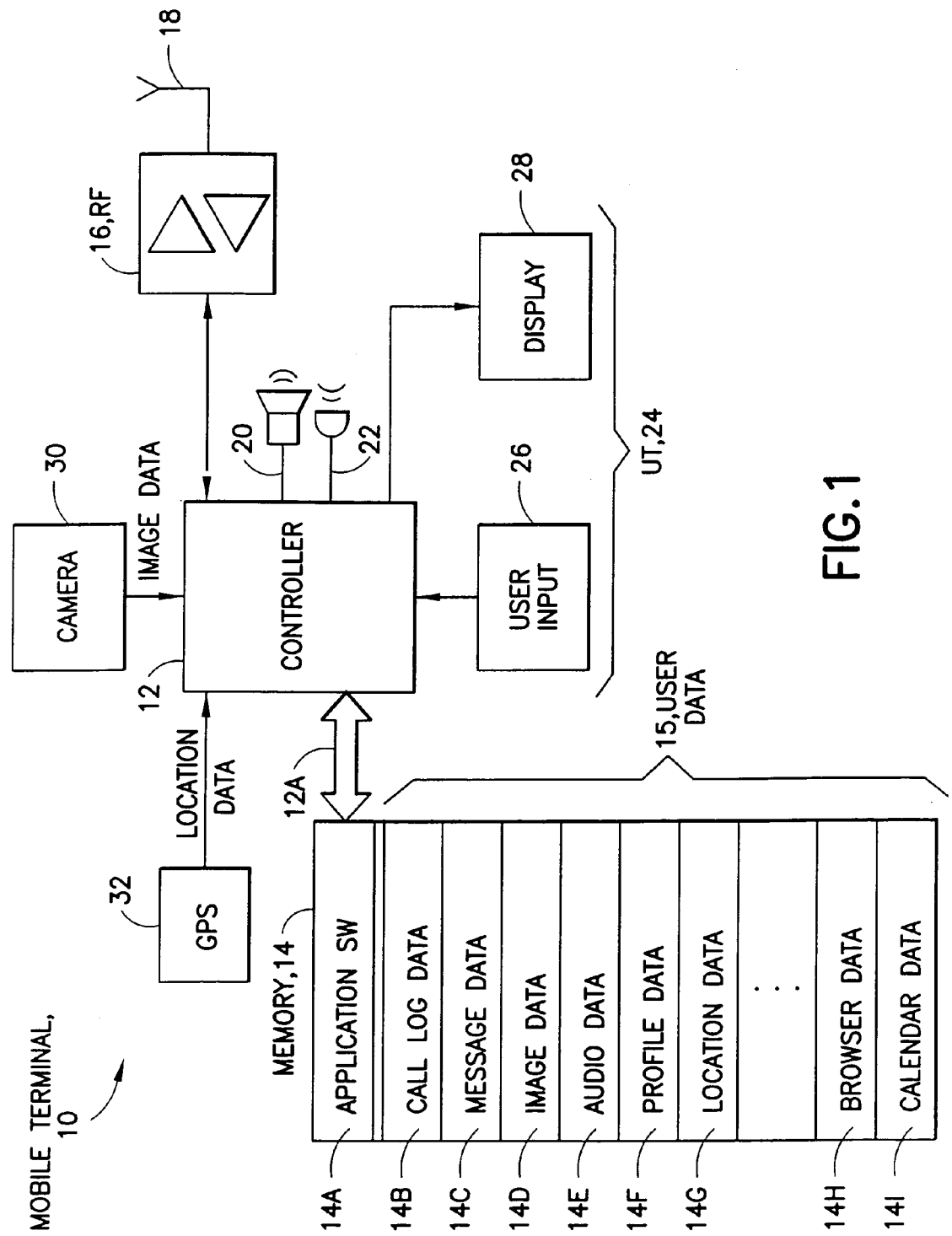
FIG. 1 is a block diagram of a mobile terminal that is suitable for practicing this invention.

Reference is first made to FIG. 1 for showing a block diagram of a mobile terminal 10 that is suitable for practicing this invention. The mobile terminal 10 in this embodiment is assumed to be a mobile user communications device, such as a cellular telephone, although the teachings of this invention do not require that the mobile terminal 10 have voice communication capability.

The mobile terminal 10 includes a controller 12, which may represent a combination of a general purpose or a specialized microprocessor or microcontroller and a digital signal processor (DSP) device. The controller 12 is coupled over an internal or external bus 12A to a memory 14 that stores application software (sw) 14A, including software that is executed by the controller to implement this invention. The memory 14 may actually be implemented in more than one memory device, and the memory devices may be of different types (e.g., read-only memory and read-write memory, including read-write non-volatile memory). The application software 14A also typically includes software for implementing a blog in cooperation with some remote blog server (not shown). The memory 14 also stores user data 15, referred to herein also as metadata. The user data 15 is shown, by example only, to include call log data 14B, such as records of outgoing calls, incoming calls and missed calls; message data 14C, such as incoming and outgoing text messages and emails; image data 14D, which can be obtained from an integral camera 30, or from some other source; audio data 14E, which can be obtained from a microphone 22, or from voice messages received by the mobile terminal 10 from a calling party; user profile data 14F; location data 14G, such as data generated by an integral GPS receiver 32 and/or from a wireless network (such as cell identification (cell_id) information received from base stations (not shown)); browser data 14H; and calendar data 14I, typically generated and maintained by a calendar/clock function that is implemented by the application software 14A. Videos and assorted types of sensor data, for example, temperature, lighting, humidity, and accelerator data can also be stored. For convenience, all of this data 14B-14I may be referred to collectively as the user data 15. Essentially, all data that is stored or collected to the terminal is considered to be user data 15. This data can be very descriptive of the user's typical work or leisure day, and is thus well suited for forming the basis of the user's mobile blog entries.

The mobile terminal 10 further has a user interface 24 that includes a user input device 26 (such as a keypad and/or a navigation device), as well as a display 28. In the preferred embodiment there is a radio frequency (RF) block 16 that is connected between the controller 12 and an antenna 18, that enables communications to occur with remote persons and servers, such as servers that form a part of, or that are reachable through, a wireless network operator. A connection to the internet can be provided, and some of the servers can have world wide web (www) network addresses. The blog server referred to above is one typical server that may be communicated with, and facilitates the publishing of the user's blog on the internet.

The specifics of the type of RF block 16, and the type of modulation, access format and air interface standard that are used (e.g., GSM, CDMA, WCDMA, etc.) are not germane to the understanding of this invention, and the practice of this invention should not be construed as being limited for use with any particular type of air interface standard, or as excluding any particular type of air interface standard from use. Further, the antenna 18 could be for coupling the mobile terminal 10 to a low power RF network such as a Bluetooth network which may implement a Bluetooth-based WLAN. In other embodiments of this invention the antenna and RF circuitry block 16 could be replaced with a suitable infrared (IR) transmitter and receiver.

For a typical cellular telephone implementation of the mobile terminal 10 there will also be a speaker 20.

Figure 2:
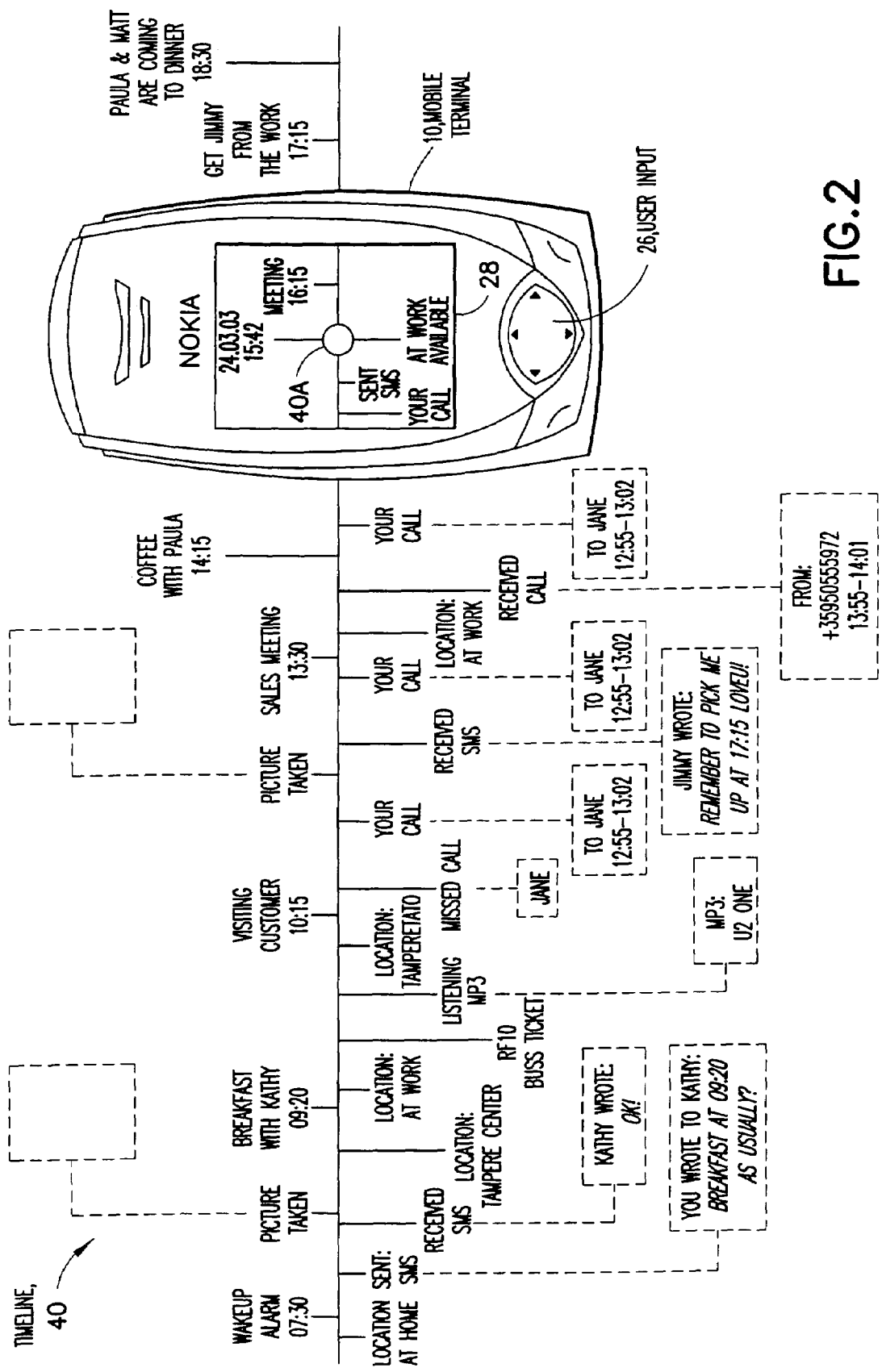
FIG. 2 is an example of a timeline representation of a user's activity based on user data stored in the mobile terminal of FIG. 1.

Referring to FIG. 2, in accordance with an aspect of this invention the data stored in the memory 14 that is indicative of the usage history of the mobile terminal 10 may be presented to the user, via the display 28, in a temporal format. The presently preferred temporal format is a timeline 40. The use of the timeline 40 is advantageous, as it presents list-based textual information, such as that related to the call log data 14B and the message data 14C, in a graphical format that is more intuitively understood by the user.

The illustrated example of the timeline 40 covers a portion of a single day, and includes location information (e.g., home, work) derived from the location data 14G, as well as calendar/clock information (e.g., meetings and other scheduled events) derived from the calendar data 14I, outgoing and received call information (time and called or calling party name or number) derived from the call log data 14B, message data (e.g., received SMS) derived from the message data 14C, and camera 30 related information (which can be presented as thumbnail images) derived from the image data 14D data.

The mobile terminal 10 is shown positioned along the timeline 40 such that only a portion thereof is visible in the display 28. By manipulating the user input 26 the user is able to scroll along the timeline 40, so as to show recorded past events and expected future events. The point 40A may be considered to represent the current time, and can be automatically scrolled (to the right in this case) as time passes during the day, enabling the user to see scheduled future events as they come into view on the display 28.

The display of the cumulative information related to the usage of the mobile terminal 10 is typically meant only for the user, e.g., as a memory prosthesis. However, further in accordance with this invention the user is enabled to select, via the user input 26, all or some sub-set of this information as a basis for automatically updating the user's blog.

Figure 3A:
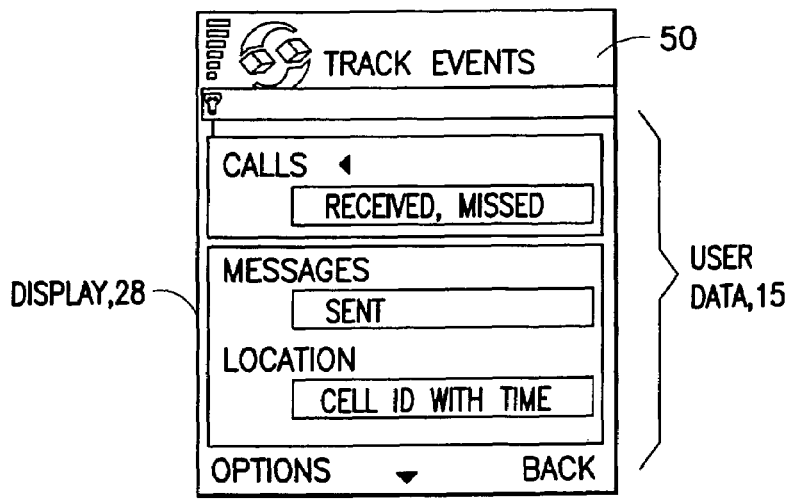
FIGS. 3A–3C, collectively referred to as FIG. 3, show an example of a user selection of stored user call log data, and the generation of an animation that characterizes the content of the user-selected call log data.

Referring to FIG. 3A, the application software 14A is assumed to include an application 50, referred to for convenience as "Track Events", that when invoked by the user presents on the display 28 various option choices for selecting some or all of the user data 15. By scrolling the display the user is presented with other choices from the user data 15, such as the image data 14D and the calendar data 14I. In the example of FIG. 3A the user is currently presented with the choice of selecting Calls (the call log data 14B), Messages (the message data 14C) and Location (the location data 14G). In this example the user has selected Calls, and is presented with the display shown in FIG. 3B. In this case it is assumed that the user has selected Missed Calls and Received Calls (but not Dialed Calls). The selected information is then used as the basis for updating the user's blog.

In general, the selected information can include, metadata related to missed calls; metadata related to received calls; metadata related to dialed calls; metadata related to sent messages (e.g., SMS or email messages); metadata related to received messages; location information related to changed cell Ids; metadata related to applications used during the day (or any other time period of interest); games that were played by the user; the camera 30; a video/audio recorder (e.g., MP3); the browser (browser data 14H); user profiles (the profile data 14F); and a calculator application.

In general, the selected information is indicative of the general activity and interaction of the user with the mobile terminal 10 (e.g., how much time the user has spent using the mobile terminal 10, and what type of activity occurred). In addition, the user can preferably also publish calendar events (calendar data 14I) as free/busy times or text; as well as presence (location) information.

Since the usage of the mobile terminal 10 is in many cases ubiquitous and highly correlated with the user's daily activity, it can be appreciated that the foregoing metadata can be very descriptive of the user's typical work or leisure day, and is thus well suited for forming the basis of the user's mobile blog entries.

Further in accordance with an aspect of this invention, the information (metadata) that is selected by the user forms the basis of a visualization to the current day of the blog. Referring to FIG. 3C, the user's blog 60 visualization may be, as an example, an animation 62, such as a cat, and some related descriptive text 64, which are visualized based on the selected usage metadata information of the mobile terminal 10. For example, if the user has made many phone calls (some number greater than some system or user selected threshold), and has also been on the move (e.g., changed cell ids more than some predetermined threshold number of times), then the cat animation 62 in the blog 60 mews and moves according to the user's real activities. If fewer phone calls and/or cell id changes have occurred during the day (or some other system or user-defined time period), then the cat animation 62 can be depicted as at rest, or as asleep.

In the example of FIG. 3C the (optional) descriptive text is derived by the blog application software 14A from the underlying selected metadata, such as from the number of received calls and calendar data 14I. As in the example of FIG. 3C, the underlying selected metadata can include the calendar data 14I, and a high priority calendar schedule entry may exist to contact Brian by a certain time, and a corresponding entry exists in the called numbers of the call log data 14B, or in the sent messages of the message data 14C, showing that an outgoing call was made to, or an email or SMS was sent to Brian at or before the scheduled time. In response to both of these conditions being satisfied, the blog application software 14A automatically generates the text string "Luckily I got the message to Brian on time." If there was no corresponding entry in the called numbers of the call log data 14B, or in the sent messages of the message data 14C, showing that an outgoing call was made to, or an email or SMS was sent to Brian at or before the scheduled time, then the blog application software 14A may instead automatically generate the text string "Unfortunately, I was not able to get the message to Brian on time."

As can be appreciated, it is an aspect of this invention that the blog entry is created automatically by the mobile terminal blog application software 14A, although the user may be given the opportunity to revise or amend the animation 62 and/or the text 64 before the blog is actually published.

The cat animation 62 is of course merely exemplary. As can be appreciated, the number of different types of animations that can be used is basically limitless. Furthermore, it is within the scope of this invention to enable the user to select and download an animation or animations from a remote animation server to the mobile terminal 10. The blog 60 visualization may be other than an animation 62 such as, for example, a chart, or a color indication (e.g., blue indicates minimal mobile terminal 10 usage, while red indicates high usage). It is also within the scope of this invention to publish as part of the blog 60 the timeline 40, or a selected sub-set of the timeline 40 (e.g., the timeline 40 with all specific contact and/or location information removed, as directed by the user).

It can be appreciated that the use of this invention enhances the real-time and active nature of the mobile blog 60, and furthermore requires a minimal amount of user effort to update the blog. Furthermore, in that the metadata used as the basis for updating the blog is represented through a visualization, such as the animation 62 and/or related descriptive text 64, the underlying detailed metadata need not be published, thereby preserving the user's privacy. Note in this regard that in FIG. 3C the actual number of calls received or made by the user is not disclosed, nor is the contact information for Brian, nor is the reason for sending the message to Brian, nor is the actual content of the message. It can thus be appreciated that the specific details of the user's actual interaction with the mobile terminal 10 can be filtered by the blog application software 14A, and that a high level summary of the interaction is what is actually published.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

Figure 3B:
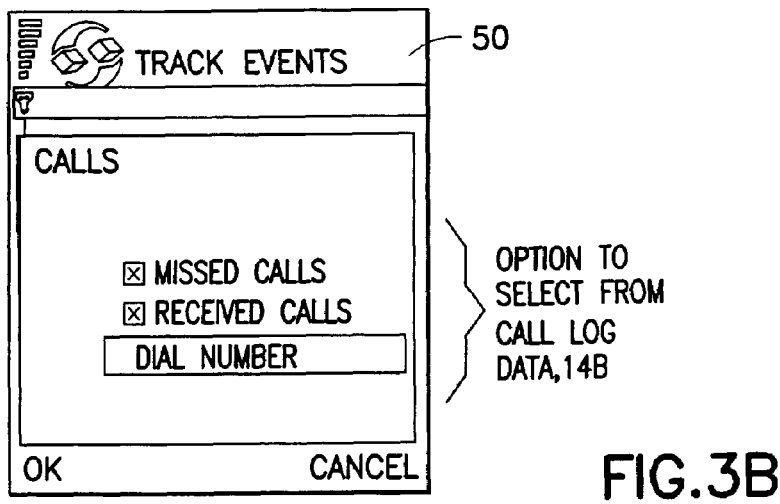
Figure 3C:
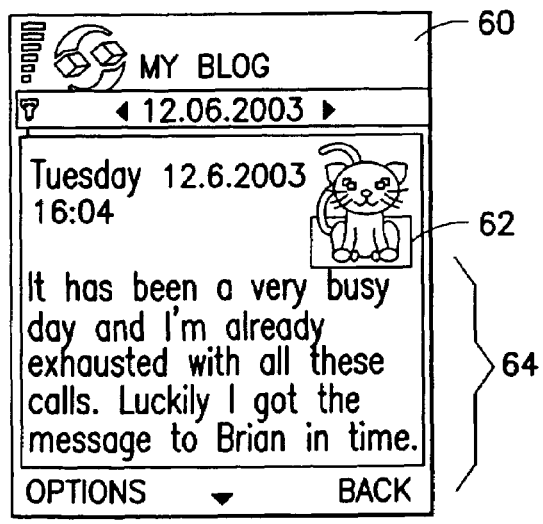

As but one example, in lieu of the technique shown in FIGS. 3A and 3B for selecting the metadata types to be used as the basis for updating the blog 60, it is within the scope of the invention to enable the user to employ the user input 26 to navigate over the displayed timeline 40 and to select certain items, such as received calls and calendar events, that are taken by the blog application software 14A as defining the metadata-type to be used for updating the blog 60. For example, selecting just one of the "Received SMS" timeline items may be interpreted by the blog application software 14A as the user selecting "Received Messages" in the message data 14C as a category of metadata to be used in constructing the user's mobile blog 60. However, all such modifications of the teachings of this invention will still fall within the scope of this invention.

Further, while the method and apparatus described herein are provided with a certain degree of specificity, the present invention could be implemented with either greater or lesser specificity, depending on the needs of the user.

Still further, some of the features of this invention could be used to advantage without the corresponding use of other features. For example, the timeline 40 metadata representation shown in FIG. 2 could be used in a mobile terminal 10 that does not support the use of the blog 60, and the blog implementation of FIGS. 3A–3C could be used in a mobile terminal 10 that does not support the display of the timeline 40 of FIG. 2.

As such, the foregoing description should be considered as merely illustrative of the principles of the present invention, and not in limitation thereof, as this invention is defined by the claims which follow.

What is claimed is:

1. A mobile terminal, comprising:
    a memory storing application software and data that is descriptive of the use of the mobile terminal;
    a display; and
    a controller, coupled to the memory and responsive to the application software and to at least a sub-set of the stored data, for visualizing on the display, in a graphical form, the use of the mobile station over a period of time, where the controller is further responsive to the application software and to at least the sub-set of the stored data for deriving a content of a web log (blog), where the blog comprises an animation that is indicative of the use of the mobile station over the period of time.

2. A mobile terminal as in claim 1, where the controller constructs a chronological visualization of the use of the mobile station.

3. A mobile terminal as in claim 1, where the controller constructs a temporally-based visualization of the use of the mobile station.

4. A mobile terminal as in claim 3, where the temporally-based visualization incorporates scheduled events.

5. A mobile terminal as in claim 3, where the temporally-based visualization incorporates mobile terminal location information.

6. A mobile terminal as in claim 3, where the temporally-based visualization incorporates mobile terminal sensor data information.

7. A mobile terminal as in claim 3, where the temporally-based visualization incorporates at least one of telephone calls that are made from and made to the mobile terminal.

8. A mobile terminal as in claim 3, where the temporally-based visualization incorporates at least one of messages that are sent from and sent to the mobile terminal.

9. A mobile terminal as in claim 3, where the temporally-based visualization incorporates an indication of images that are captured by the mobile terminal.

10. A mobile terminal as in claim 1, where the controller is further responsive to the application software and to at least the sub-set of the stored data for deriving the content of the web log (blog), and for transmitting the blog for publication.

11. A mobile terminal as in claim 1, where the controller is further responsive to the application software and to at least the sub-set of the stored data for filtering the data to derive the content of the web log (blog).

12. A mobile terminal as in claim 1, where the controller is further responsive to the application software and to a user input device for selecting at least the sub-set of the stored data for deriving the content of the web log (blog).

13. A mobile terminal as in claim 1, where the sub-set of the data is selected by the user through the use of a user input device of the mobile terminal.

14. A method to operate a mobile terminal having a memory storing application software and data that is descriptive of the use of the mobile terminal, and further having a display and a controller coupled to the memory, comprising:
responsive to the application software and to at least a sub-set of the stored data, deriving a representation of the use of the mobile station over a period of time; and
presenting the derived representation, further comprising automatically deriving a content of a web log (blog) from user-selected data stored in the memory, where the blog comprises an animation that is indicative of the use of the mobile station over the period of time.

15. A method as in claim 14, where the derived representation is presented graphically.

16. A method as in claim 14, where the derived representation is presented by auditory means.

17. A method as in claim 14, where the derived representation is presented textually.

18. A method as in claim 14, where the controller derives a temporally-based representation of the use of the mobile station.

19. A method as in claim 18, where the temporally-based representation incorporates scheduled events.

20. A method as in claim 18, where the temporally-based representation incorporates mobile terminal location information.

21. A method as in claim 18, where the temporally-based representation incorporates at least one of telephone calls that are made from and made to the mobile terminal.

22. A method as in claim 18, where the temporally-based representation incorporates at least one of messages that are sent from and sent to the mobile terminal.

23. A method as in claim 18, where the temporally-based representation incorporates an indication of images that are captured by the mobile terminal.

24. A method as in claim 14, where the controller derives a chronological representation of the use of the mobile station.

25. A method as in claim 14, further comprising automatically deriving the content of the web log (blog) from user-selected data stored in the memory, and transmitting the blog for publication.

26. A method as in claim 14, further comprising filtering user-selected data stored in the memory to derive the content of the web log (blog).

27. A method as in claim 14, further comprising selecting at least the sub-set of the stored data for deriving the content of the web log (blog).

28. A method as in claim 14, where the sub-set of the data is selected by the user through the use of a user input device of the mobile terminal.

29. A mobile terminal, comprising:
a memory storing application software and data that is descriptive of the use of the mobile terminal;
a display; and
a controller, coupled to the memory and responsive to the application software and to at least a sub-set of the stored data, for constructing a web log (blog), where the blog comprises an animation that is indicative of the use of the mobile station over the period of time.

30. A mobile terminal as in claim 29, where the blog comprises textual data that is automatically generated in accordance with the use of the mobile station over the period of time.

31. A method to operate a mobile terminal having a memory storing application software and data that is descriptive of the use of the mobile terminal, and further having a display and a controller coupled to the memory, comprising:
selecting at least a portion of the data; and
constructing a web log (blog) that comprises an animation that is indicative of the use of the mobile station over the period of time, as indicated by the selected portion of the data.

32. A method as in claim 31, where the blog comprises textual data that is automatically generated in accordance with the use of the mobile station over the period of time.

33. A mobile terminal, comprising:
a memory storing application software and data that is descriptive of the use of the mobile terminal;
a display; and
a controller, coupled to the memory and responsive to the application software and to at least a sub-set of the stored data, for visualizing on the display, in a graphical form, the use of the mobile station over a period of time, where the mobile terminal is able to scroll along a timeline of list-based textual information, the controller constructing a web log (blog) that comprises an animation that is indicative of the use of the mobile station over the period of time.

34. A mobile terminal as in claim 33, wherein only a portion of the timeline is visible in the display.

* * * * *